United States Patent

Noda et al.

(10) Patent No.: US 6,667,018 B2
(45) Date of Patent: *Dec. 23, 2003

(54) CATALYST-ADSORBENT FOR PURIFICATION OF EXHAUST GASES AND METHOD FOR PURIFICATION OF EXHAUST GASES

(75) Inventors: Naomi Noda, Ichinomiya (JP); Fumio Abe, Handa (JP); Junichi Suzuki, Kuwana (JP)

(73) Assignee: NGK Insulators, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/579,907

(22) Filed: Dec. 28, 1995

(65) Prior Publication Data

US 2001/0053340 A1 Dec. 20, 2001

(51) Int. Cl.$^7$ .............................. B01J 8/02; B01J 29/068
(52) U.S. Cl. ............................... 423/213.5; 423/213.2; 502/66
(58) Field of Search .......................... 423/213.2, 213.5; 502/66

(56) References Cited

U.S. PATENT DOCUMENTS

| | | | | |
|---|---|---|---|---|
| 5,078,979 A | | 1/1992 | Dunne | 423/212 |
| 5,164,350 A | | 11/1992 | Abe et al. | 502/66 |
| 5,376,610 A | * | 12/1994 | Takahata et al. | 423/213.7 |
| 5,447,694 A | * | 9/1995 | Swaroop et al. | 423/213.5 |
| 5,459,119 A | * | 10/1995 | Abe et al. | 423/213.5 |
| 5,494,878 A | * | 2/1996 | Murakami et al. | 423/213.5 |
| 5,538,697 A | * | 7/1996 | Abe et al. | 423/213.7 |

FOREIGN PATENT DOCUMENTS

| | | | |
|---|---|---|---|
| EP | 0 485 180 A1 | 5/1992 | |
| EP | 0 582 971 A1 | 2/1994 | |
| EP | 602963 | * 6/1994 | 423/213.2 |
| EP | 0 638 710 A2 | 2/1995 | |
| EP | 0 669 157 A1 | 8/1995 | |
| JP | 2-56247 | 2/1990 | |
| JP | 2-174937 | 7/1990 | B01J/29/04 |
| JP | 4-176337 | 6/1992 | |
| JP | 5-293376 | 11/1993 | |
| JP | 5-293384 | 11/1993 | B01J/35/04 |
| JP | 6-376 | 1/1994 | |
| JP | 6-126165 | 5/1994 | B01J/20/18 |
| JP | 6-233918 | * 8/1994 | |
| JP | 7-185325 | 7/1995 | B01J/20/18 |
| JP | 7-185326 | 7/1995 | B01J/20/18 |

OTHER PUBLICATIONS

Hepburn, Jeffrey S., et al., "Development of Pd–only Three Way Catalyst Technology", SAE Paper 941058, pp. 1–7, (1994).

Summers, J.C., et al ., "Use of Light–Off Catalysts to Meet the California LEV/ULEV Standards", SAE Paper 930386, pp. 143–149 Only (1993).

* cited by examiner

*Primary Examiner*—Stanley S. Silverman
*Assistant Examiner*—Jonas N. Strickland
(74) *Attorney, Agent, or Firm*—Parkhurst & Wendel, L.L.P.

(57) ABSTRACT

A catalyst-adsorbent for purification of exhaust gases, including a monolithic carrier and a catalyst-adsorbent layer formed thereon, the catalyst-adsorbent layer including a catalyst for reduction of the carbon monoxide, hydrocarbons and nitrogen oxides emitted from internal combustion engines and an adsorbent for reduction of the hydrocarbons emitted during cold start of the engines. The catalyst is composed mainly of catalyst particles each including a heat-resistant inorganic oxide and at least one noble metal selected from Pt, Pd and Rh, loaded thereon, the catalyst containing at least catalyst particles each comprising a heat-resistant inorganic oxide and 2–30% by weight, based on the oxide, of Pd loaded thereon, the adsorbent comprising adsorbent particles composed mainly of zeolite.

28 Claims, 2 Drawing Sheets

CATALYST-ADSORBENT FOR PURIFICATION OF EXHAUST GASES AND METHOD FOR PURIFICATION OF EXHAUST GASES

BACKGROUND OF THE INVENTION AND THE RELATED ART

The present invention relates to a catalyst-adsorbent for purification of exhaust gases and a method for purification of exhaust gases using the catalyst-adsorbent. More particularly, the present invention relates to a catalyst-adsorbent for purification of exhaust gases, capable of effectively purifying harmful substances present in exhaust gases, particularly hydrocarbons generated in a large amount during the cold start of an internal combustion engine, as well as to a method for purification of exhaust gases using the catalyst-adsorbent.

Various catalysts have heretofore been proposed for purification of harmful components [e.g. hydrocarbons (HC), carbon monoxide (CO) and nitrogen oxides ($NO_x$)] present in exhaust gases emitted from automobiles, and the like. For example, three-way catalysts containing Pd showing an excellent low-temperature light-off performance, in a relatively high concentration as the only noble metal component showing a catalytic activity, are proposed in SAE Paper Nos. 941058 and 930386.

Also, zeolite-containing catalysts are disclosed in Japanese Patent Application Kokai (Laid-Open) Nos. 293384/1993 and 174937/1990, and Japanese Patent Application No. 305429/1990.

In order for a catalyst to exhibit its catalytic activity, the catalyst must be heated to a given temperature or higher. Therefore, during the cold start of an automobile engine when the catalyst provided in the exhaust gas system is not heated sufficiently, the harmful components of the exhaust gas are discharged into the air without being purified. While regulations on the harmful components present in exhaust gases, particularly HC are becoming more strict, HC is generated in a large amount during the cold start. Hence, it is an important technical task to control the discharge of HC into air during the cold start.

In this connection, attention has recently been paid to a technique of utilizing the zeolite adsorptivity for HC and allowing a zeolite-containing adsorbent to adsorb the HC generated during cold start of an engine, from the start of the engine to a time when the catalyst active component is heated sufficiently.

When there are used, of the above-mentioned techniques, the catalysts proposed by SAE Paper Nos. 941058 and 930386, containing no zeolite as an adsorbent although containing Pd of excellent-light off performance in a relatively high concentration, the HC, which is generated in a large amount during cold start of the engine, is discharged into the air without being purified, up to the time when the catalyst is activated. Further, since the catalysts contain no adsorbent, no optimization is employed to effectively purify a high concentration of the HC generated when the HC adsorbed by an adsorbent is desorbed from the adsorbent.

In the catalyst disclosed in Japanese Patent Application No. 305429/1990, zeolite is used merely as a substrate for loading a noble metal and is not optimized as an adsorbent; therefore, the catalyst has an insufficient adsorptivity. Moreover, the catalyst contains Pd in a low concentration, is insufficient in light-off performance and purification ability, and is unable to effectively purify a high concentration of the HC desorbed from the adsorbent as the engine warms up.

In the catalysts disclosed in Japanese Patent Application Kokai (Laid-Open) No. 293384/1993, no optimization (in presence or absence of Pd, Pd concentration, etc.) is made to effectively purify a high concentration of the HC-desorbed from zeolite; therefore, the catalyst is insufficient in light-off performance and purification ability.

In the catalyst system disclosed in Japanese Patent Application Kokai (Laid-Open) No. 174937/1990, zeolite is used as a substitute for Rh to reduce the amount of Rh (which is an expensive noble metal very small in ore reserve) and no adsorbent optimization is made; therefore, the catalyst has an insufficient adsorptivity. Moreover, the catalyst contains a low concentration of Pd, is insufficient in light-off performance and purification ability, and is unable to effectivley purify a high concentration of the HC desorbed from the adsorbent as the engine warms up.

SUMMARY OF THE INVENTION

The present invention has been made in view of the above-mentioned problems of the prior art and is intended to provide (1) a catalyst-adsorbent wherein zeolite can effectively act as an adsorbent for HC and the concentrations of catalyst active components, etc. are optimized so that a high concentration of the HC desorbed from the adsorbent with the engine warms up can be effectively purified, and (2) a method for effective purification of exhaust gases using the catalyst-adsorbent (1).

According to the present invention there is provided a catalyst-adsorbent for purification of exhaust gases, comprising a monolithic carrier and a catalyst-adsorbent layer formed thereon, the catalyst-adsorbent layer comprising a catalyst for reduction of the carbon monoxide, hydrocarbons and nitrogen oxides emitted from internal combustion engines and an adsorbent for reduction of the hydrocarbons emitted during cold start of said engines, the catalyst being composed mainly of catalyst particles each comprising a heat-resistant inorganic oxide and at least one noble metal selected from Pt, Pd and Rh, loaded thereon, the catalyst containing at least catalyst particles each comprising a heat-resistant inorganic oxide and 2–30% by weight, based on said oxide, of Pd loaded thereon, the adsorbent comprising adsorbent particles composed mainly of zeolite.

According to the present invention, there is also provided a method for purification of exhaust gases, which comprises providing a catalyst-adsorbent in an exhaust gas system of an internal combustion engine and conducting exhaust gas purification while introducing secondary air into the exhaust gas system at a site upstream of the catalyst-adsorbent for a certain length of time during cold start of the engine, in which the catalyst-adsorbent comprises a monolithic carrier and a catalyst-adsorbent layer formed thereon, the catalyst-adsorbent layer comprising a catalyst for reduction of the carbon monoxide, hydrocarbons and nitrogen oxides emitted from internal combustion engines and an adsorbent for reduction of the hydrocarbons emitted during cold start of said engines, the catalyst being composed mainly of catalyst particles each comprising a heat-resistant inorganic oxide and at least one noble metal selected from Pt, Pd and Rh, loaded thereon, the catalyst containing at least catalyst particles each comprising a heat-resistant inorganic oxide and 2–30% by weight, based on said oxide, of Pd loaded thereon, the adsorbent comprising adsorbent particles composed mainly of zeolite.

According to the present invention there is further provided a method for purification of exhaust gases, which comprises providing a catalyst-adsorbent in an exhaust gas system of an internal combustion engine and conducting exhaust gas purification while regulating amounts of combustion air and fuel for a certain length of time during cold start of the engine to shift the composition of the exhaust gas to a lean side, in which method the catalyst-adsorbent comprises a monolithic carrier and a catalyst-adsorbent layer formed thereon, the catalyst-adsorbent layer comprising a catalyst for reduction of the carbon monoxide, hydrocarbons and nitrogen oxides emitted from internal combustion engines and an adsorbent for reduction of the hydrocarbons emitted during cold start of said engines, the catalyst being composed mainly of catalyst particles each comprising a heat-resistant inorganic oxide and at least one noble metal selected from Pt, Pd and Rh, loaded thereon, the catalyst containing at least catalyst particles each comprising a heat-resistant inorganic oxide and 2–30% by weight, based on said oxide, of Pd loaded thereon, the adsorbent comprising adsorbent particles composed mainly of zeolite.

DETAILED DESCRIPTION OF THE INVENTION

The catalyst-adsorbent and the method both for purification of exhaust gases according to the present invention are constituted as above. The HC generated in a large amount during cold start of the engine is first adsorbed by the adsorbent composed mainly of zeolite, of the catalyst-adsorbent layer formed on the monolithic carrier of the present catalyst-adsorbent; then the adsorbed HC is desorbed from the adsorbent as the engine warms up and the temperature of the exhaust gas increases and is purified effectively mainly by the action of the catalyst of the catalyst-adsorbent layer. At this time, the HC can be purified at a very high efficiency when secondary air is introduced into the exhaust system at a site upstream of the catalyst-adsorbent or when amounts of combustion air and fuel are regulated to shift the air-fuel ratio to a lean side.

The catalyst favorably purifies not only the HC desorbed from the adsorbent but also other harmful components generated during cold start and the steady-state operation after engine warm up.

The present invention is hereinafter described in detail.

In the present invention, the catalyst is mainly composed of catalyst particles each comprising a heat-resistant inorganic oxide and at least one noble metal selected from Pt, Pd and Rh, located thereon and contains at least catalyst particles each comprising a heat-resistant inorganic oxide and 2–30% by weight, based on the inorganic oxide, of Pd loaded thereon (the catalyst particles each comprising 2–30% by weight of Pd are hereinafter referred to as "Pd catalyst particles").

In the Pd catalyst particles, Pd of high concentration (2–30% by weight based on the heat-resistant inorganic oxide) acts effectively for purification of exhaust gas and is excellent particularly in low-temperature light-off performance; therefore, Pd is an essential component for purification of a high concentration of the HC desorbed from the adsorbent with the engine warm-up and resultant temperature increase of the exhaust gas. The reason why the Pd concentration is made 2–30% by weight based on the heat-resistant inorganic oxide is that when the concentration is less than 2% by weight, no improvement in light-off performance is a obtained and the purification ability for a high concentration of HC is insufficient and, when the concentration is more than 30% by weight, the dispersion of Pd in heat-resistant inorganic oxide is significantly low. Use of Pd in an amount of 2–20% by weight is preferable because Pd can be dispersed sufficiently, the light-off performance is improved, a high concentration of the HC desorbed from the adsorbent can be purified sufficiently, and the catalyst durability is improved.

Incidentally, the Pd catalyst particles preferably contain Pd as the only noble metal in order to avoid alloying of Pd with other noble metal(s) and consequent deactivation of Pd.

The catalyst particles other than the Pd catalyst particles can each contain Pd, Pt (for improvement of catalyst activity in high-temperature steady state operation) and Rh (effective for selective reduction of $NO_x$) singly or in any combination. When these catalyst particles each contain a plurality of noble metals, it is preferable for prevention of alloying that Pd and Rh do not exist together in any particle; and from the standpoint of durability it is preferable that each particle contains only one noble metal. The concentrations of Rh and Pt relative to the heat-resistant inorganic oxide are preferably each 0.2–2.5% by weight. When each concentration is less than 0.2% by weight, no additional effect of the noble metal is obtained. When each concentration is more than 2.5% by weight, the dispersion of the noble metal is low.

The total amount of Pd in catalyst is preferably 10–700 g per $ft^3$ of the catalyst-adsorbent (0.35–24.72 g/l). When the amount is less than 10 g/$ft^3$ (0.35 g/l), the resulting catalyst has problems in light-off performance and durability. When the amount is more than 700 g/$ft^3$ (24.72 g/l), the catalyst cost is too high. The total amount of Pd is particularly preferably 70–250 g/$ft^3$ (2.47–8.83 g/l) in view of the cost and performance of catalyst.

The total amounts of Pt and Rh in catalyst are preferably 0–60 g per $ft^3$ of the catalyst-adsorbent (0–2.12 g/l) and 0–30 g per $ft^3$ of the catalyst-adsorbent (0–1.06 g/l), respectively. When the amounts of Pt and Rh exceed 60 g/$ft^3$ (2.12 g/l) and 30 g/$ft^3$ (1.06 g/l), respectively, the resulting catalyst is not preferable in cost and dispersion.

At least part of the Pd catalyst particles is preferably provided at a position of the catalyst-adsorbent layer ranging from the layer surface to the midpoint of the layer thickness. More preferably, at least part of the Pd catalyst particles is exposed at the surface of the catalyst-adsorbent layer. By thus providing Pd in a high concentration in the vicinity of the surface of the catalyst-adsorbent layer, a remarkably improved low-temperature light-off performance can be obtained. That is, CO and HC diffuse into the catalyst-adsorbent layer and reach the Pd catalyst particles present in the vicinity of the layer surface, whereby light-off is promoted (the CO and HC act as triggers). Moreover, when the Pd catalyst particles are provided at a position of the catalyst-adsorbent layer ranging from the layer surface to the midpoint of the layer thickness, the diffusion of HC emitted from the engine, into Pd catalyst particles is easy and the contact of a high concentration of HC desorbed from the adsorbent, with Pd catalyst particles and resulting purification of the HC takes place at a high efficiency. When the Pd catalyst particles are exposed at the surface of the catalyst-adsorbent layer, the contact of HC and CO with the particles is easier, resulting in even better low-temperature light-off performance.

In order to achieve the best low-temperature light-off performance, it is preferable that a Pd surface layer containing, as the catalyst particles, only Pd catalyst particles comprising a heat-resistant inorganic oxide and Pd loaded thereon as the only noble metal is formed on the surface of the catalyst-adsorbent layer. In this case, the HC desorbed from the adsorbent contacts with the Pd catalyst particles without fail. The above Pd surface layer may contain, besides the Pd catalyst particles, a rare earth element oxide (e.g. $CeO_2$), for example.

The presence of catalyst particles containing Pt or Rh or a plurality of noble metals selected from Pt, Pd and Rh, beneath the Pd surface layer is preferable because such constitution can additionally have the above-mentioned properties given by Pt or Rh. In view of the durability, however, the catalyst of the present catalyst-adsorbent preferably contains, as the catalyst particles, only Pd catalyst particles comprising a heat-resistant inorganic oxide and Pd loaded thereon as the only noble metal. In one preferred embodiment, such a catalyst is mixed with an adsorbent (described in detail later) to form a catalyst-adsorbent layer. In another preferred embodiment, a first layer of an adsorbent is formed on a monolithic carrier; and thereon is formed a second layer of a catalyst containing, as the catalyst particles, only Pd catalyst particles comprising a heat-resistant inorganic oxide and Pd loaded thereon as the only noble metal, to form a two-layered catalyst-adsorbent layer having good durability and low-temperature light-off performance.

When there are used catalyst particles of at least two kinds each comprising a noble metal(s), they are preferably provided in respective layers in view of the catalyst durability.

As the heat-resistant inorganic oxide on which a noble metal(s) is (are) loaded, there can be suitably used active alumina, zirconia, silica, titania, etc. Of these, active alumina and/or zirconia is preferred in view of the interaction with the noble metal(s).

When an active alumina having a specific surface area of 100 $m^2/g$ or more is used, a noble metal(s) is (are) loaded thereon in a high dispersion state, whereby preferable catalytic activity is expressed. Zirconia, when used in combination with Rh, provides improved heat resistance particularly in an oxidizing atmosphere.

To the heat-resistant inorganic oxide is ordinarily added a rare earth element oxide, a compound oxide of rare earth element oxides or a compound oxide of a rare earth element oxide and zirconia.

As the rare earth element oxide to be added to the heat-resistant inorganic oxide, there can be suitably used $CeO_2$, $La_2O_3$, a compound oxide thereof, etc. The addition of such a rare earth element oxide provides a catalyst of a higher oxygen storage capacity (OSC) and wider three-way catalytic performance.

The addition of a rare earth element oxide to a heat-resistant inorganic oxide, for example, the addition of $CeO_2$ to active alumina may be conducted by adding a $CeO_2$ powder to active alumina. However, it can be conducted particularly preferably by impregnating active alumina with a cerium compound, calcinating the impregnated alumina to form an active alumina-ceria compound oxide, and adding thereto a $CeO_2$ powder as necessary, because this practice can improve the heat resistance of active alumina and the OSC of ceria.

Addition of $CeO_2$ to a heat-resistant inorganic oxide is preferably avoided when Rh is loaded on the inorganic oxide because the properties of Rh are impaired by the coexistence of $CeO_2$. With respect to the position at which $CeO_2$ is present, $CeO_2$ may be dispersed uniformly in the catalyst-adsorbent layer. $CeO_2$ shows its effect even when it is present at a position slightly inside from the surface of the catalyst-adsorbent layer. Accordingly, when a Pd surface layer is formed, the presence of $CeO_2$ or Pd-loaded $CeO_2$ inside from the Pd surface layer (regardless of whether or not the Pd surface layer contains $CeO_2$) is one preferred embodiment.

The rare earth element oxide, the compound oxide of rare earth element oxides or the compound oxide of a rare earth element oxide and zirconia may load thereon a noble metal (s), together with the heat-resistant inorganic oxide, or may be per se added to the catalyst.

The amount of the rare earth element oxide, the compound oxide of rare earth element oxides or the compound oxide of a rare earth element oxide and zirconia, to be added to the heat-resistant inorganic oxide is 2–50% by weight based on the heat-resistant inorganic oxide. When the amount is less than 2% by weight, the effect of the addition is little seen; and when the amount is more than 50% by weight, light-off performance is not improved efficiently.

The adsorbent of the present catalyst-adsorbent will now be described.

The adsorbent comprises adsorbent particles composed mainly of zeolite. Zeolite, which is the main component of the adsorbent particles, is typically a crystalline aluminosilicate having a three-dimensional network structure formed by tetrahedrons of $SiO_4$ in which Si atoms are partially replaced by Al atoms, via oxygen atoms and, in order to keep charge balance, usually contains cations such as Na and the like. High-silica zeolite having a $SiO_2/Al_2O_3$ molar ratio of 40 or more is preferred in the present invention while ordinary zeolite has a $SiO_2/Al_2O_3$ molar ratio of 1–5. The cations are preferably hydrogen ions (H type).

Use of high-silica zeolite having a $SiO_2/Al_2O_3$ molar ratio of 40 or more provides various advantages. That is, the resulting adsorbent has higher heat resistance and the resulting catalyst-adsorbent can be used under wider conditions and has higher utility; further, the resulting adsorbent has higher hydrophobicity and shows higher adsorptivity towards the HC present in exhaust gas than towards the moisture also present in exhaust gas, whereby the HC adsorption by the adsorbent is not hindered by the moisture present in exhaust gas.

A $SiO_2/A_2O_3$ molar ratio of less than 40 is not preferable because the crystal structure of zeolite is destroyed at exhaust gas temperatures of about 400–800° C. Use at high temperatures of high-silica zeolite of Na type, as compared with that of H type, is not preferable, either, because the crystal structure of such zeolite starts destruction at high temperatures, particularly at 800° C. or higher.

As the high-silica zeolite having a $SiO_2/Al_2O_3$ molar ratio of 40 or more, there can be used ZSM-5, USY, β-zeolite or the like.

When the above zeolite is used as the main component of the adsorbent particles constituting the adsorbent of the present catalyst-adsorbent, the zeolite may be used as it is or in the form containing at least one kind of ion of an element having an electronegativity of 1.40 or more, preferably 1.80 or more. An ion of an element having a large electronegativity attracts an electron(s) easily. Therefore, presence of the ion(s) in zeolite allows the zeolite to have a high interaction with HC molecules. Consequently, the zeolite has higher adsorptivity for HC and adsorbs a larger amount of HC and, moreover, desorbs the adsorbed HC at higher temperatures.

The ion of an element having an electronegativity of 1.40 or more includes ions of Al, Ti, V, Mn, Fe, Co, Ni, Cu, Zn, Pd, Ag, Pt, Au, etc. Of these, preferred are ions which are each a soft acid or an intermediate acid. Herein, "a soft acid or an intermediate acid" refers to an ion of a metal M, having a $\Delta H°/n$ of 1.8 eV or more [$\Delta H°/n$ is a value obtained by dividing the enthalpy $\Delta H°$ in a reaction of hydrating the metal M of gaseous state to ionize the metal (the reaction is represented by $M \rightarrow M^{n+} + ne^-$), with the valency n of the metal]. When metals having the same valency n are compared, a softer metal takes a larger positive value with respect to the ionization energy. With respect to the hydration enthalpy, a softer metal takes a larger negative value in a highly polar solvent such as water. Among various metals of different valencies, a metal ion of larger $\Delta H°/n$ is a softer metal ion and a metal ion of smaller $\Delta H°/n$ is a harder metal ion. In the present invention, the ions, which showed a superior effect, are ions having $\Delta H°/n$ of 1.8 eV or more, and an ion having $\Delta H°/n$ of 3.0 eV or more is more preferable. Specific examples of such ions are $Co^{2+}$, $Ni^{2+}$, $Zn^{2+}$, $Cu^{2+}$, $Cu^+$, $Ag^+$, $Au^+$ and $Fe^{2+}$. A softer acid has a larger atomic radius and a larger polarizability. Therefore, when at least one kind of such soft acid or intermediate acid ion is present in zeolite, the portion overlapping with the molecular orbital of HC (e.g. toluene or propylene) increases and the resulting zeolite can have higher adsorptivity for HC.

When the above ion is at least one kind of ion of an element selected from 1B group elements (Cu, Ag and Au) of the periodic table and present in zeolite, the ion can show high adsorptivicy for HC even in the presence of moisture and, moreover, the ion exhibits even a catalytic activity at temperatures of 150° C. or higher. Of these 1B group element ions, Cu and Ag ions are preferred and Ag ion is particularly preferred because it can adsorb a larger amount of HC up to higher temperatures. Further, Ag ion can adsorb, even when $O_2$ is absent, the same adsorptivity as when $O_2$ is present. Therefore, Ag ion shows excellent adsorptivity even when subjected to, for example, a fuel-rich atmosphere in automobile exhaust gas system. When Ag ion and Cu ion are allowed to be present together in zeolite, there can be obtained both the effect of higher adsorptivity by Ag ion and the effect of higher adsorptivity and catalytic activity by Cu ion; thus, an excellent purification ability in a wide temperature range from low temperatures to high temperatures can be obtained. Further, the presence of these two kinds of ions can prevent agglomeration of respective ions, leading to improved heat resistance.

The above ion can be allowed to be present in zeolite by ion exchange, impregnation or the like. The position (the form of coordination) of the ion in zeolite has preferably square planar coordination to the oxygen in zeolite framework, in view of the improvement in adsorptivity for HC. The reason is not certain but is presumed to be that when the ion is in the form of planar coordination, the presence of gaps above and below the plane allows for the access of HC to the ion, giving an improved adsorptivity for HC.

In order to allow the ion to be in the form of square planar coordination relative to the oxygen in zeolite framework, there can be employed a method which comprises using, in adding the ion to zeolite, a metal salt whose anion has a large three-dimensional size or a metal salt whose degree of dissociation into ion is small, to prevent the formation of square pyramid or octahedral coordination having steric hindrance and, as a result, increasing the number of the ions present in the form of planar coordination. Examples of the above metal salt are preferably metal salts of organic acids (e.g. acetic acid).

When the content of ion in zeolite is small, the effect of increase in HC desorption temperature is low. Hence, the content of ion in zeolite is preferably 20% or more, more preferably 40% or more based on the Al atoms in zeolite.

When the ion is allowed to be present in zeolite by ion exchange, the ion exchange rate can be increased by increasing the concentration of the metal salt solution used in ion exchange, or by taking a longer time for ion exchange. When ion exchange is conducted for a given length of time with a metal salt solution of a given concentration and, after filtration, ion exchange is again conducted similarly using a new metal salt solution, the ion exchange rate can be increased by increasing the times of ion exchange with new solution.

In the adsorbent of the present catalyst-adsorbent, it is desirable for improved heat resistance to allow zeolite to also contain at least one ion selected from ions of Mg, Ca, Sr, Ba, Y, La, Ti, Ce, Mn, Fe, Cr, Ni and Zn, preferably at least one ion selected from ions of Mg, Ca, Fe and Cr.

Also, presence of at least one noble metal in zeolite provides a catalyst-adsorbent having a higher overall catalytic activity and showing an excellent purification ability in a wider temperature range from low temperatures to high temperatures. As the noble metal(s), Pt, Rh and/or Pd is preferred. The total amount of noble metal(s) in zeolite is preferably 5–200 g per $ft^3$ of the catalyst-adsorbent (0.18–7.07 g/l), more preferably 5–60 g per $ft^3$ of the catalyst-adsorbent (0.18–2.12 g/l). When the amount is less than 5 g/$ft^3$ (0.18 g/l), no effect of noble metal addition is obtained. When the amount is more than 200 g/$ft^3$ (2.12 g/l), the pore volume of zeolite is reduced [when the noble metal(s) is (are) allowed to be present by ion exchange] and the dispersion of noble metal(s) is lowered [when the noble metal(s) is (are) allowed to be present by impregnation].

Zeolites such as ZSM-5, USY, β-zeolite and the like can be used singly or in combination. When they are used in combination, they can be provided (coated) on a monolithic carrier as a mixture or in respective layers. ZSM-5 having relatively small pores of about 0.55 nm in diameter is advantageous for adsorption of small molecules of HC having an effective toluene molecular diameter or smaller. USY having relatively large pores of about 0.74 nm in diameter is advantageous for adsorption of HC of large molecule having an effective m-xylene molecular diameter or larger, and β-zeolite having bimodal pores of about 0.55 nm and about 0.70 nm in diameter can relatively well adsorb both small molecules of HC and large molecules of HC.

Thus, use of a plurality of zeolites having different pore diameters, in any combination allows for adsorption of substantially all the HCs of different effective molecular diameter.

In the present catalyst-adsorbent, the catalyst-adsorbent layer supported on the monolithic carrier is constituted by the catalyst and the adsorbent both described above. The weight ratio of the catalyst and the adsorbent is preferably 90–15:10–85. When the proportion of the catalyst is less than 15% by weight, the light-off performance of the catalyst is low. When the proportion of the adsorbent is less than 10% by weight, the adsorbent has low adsorptivity for HC during cold start of the engine.

The thickness of the catalyst-adsorbent layer is preferably 20–150 μm. When the layer thickness is less than 20 μm, no sufficient durability is obtained. When the layer thickness is more than 150 μm, a large pressure drop is induced and the diffusion of exhaust gas into the inner portion (the monolithic carrier side) of the catalyst-adsorbent layer is insufficient, which invites ineffective utilization of the catalyst particles and/or the adsorbent particles present in the inner portion of the catalyst-adsorbent layer.

The catalyst-adsorbent for purification of exhaust gases according to the present invention is used under severe conditions. Hence, it is preferred that the monolithic carrier of the catalyst-adsorbent is made of a heat-resistant inorganic substance and has a honeycomb structure. Use, as the monolithic carrier, of an electrical heater capable of generating heat when electrified, obtained by attaching electrodes to a honeycomb structure is particularly preferable because the catalyst temperature can be increased quickly and because the purification during cold start of the engine can be maximized.

As the electrical heater, there may be used a foil type heater used heretofore. However, a heater obtained by powder metallurgy is preferable because it has no problem in mechanical strength and telescoping and is highly reliable.

As the material for the monolithic carrier, there is suitably used a honeycomb structure made of cordierite or a metal capable of generating heat when electrified. The honeycomb structure made of a metal includes those made of stainless steel or a material having a composition represented by Fe—Cr—Al, Fe—Cr, Fe—Al, Fe—Ni, W—Co, Ni—Cr or the like. Of these honeycomb structures, those made of Fe—Cr—Al, Fe—Cr or Fe—Al are preferred because of excellent heat resistance, oxidation resistance and corrosion resistance and low cost. The honeycomb structure may be porous or nonporous, but a porous honeycomb structure is preferred because it has higher adhesivity to the catalyst-adsorbent layer and gives rise to substantially no peeling of the catalyst-adsorbent layer caused by the difference in thermal expansion between the honeycomb structure and the layer.

Next, description is made on an example of the process for production of a metallic honeycomb structure used as one type of monolithic carrier of honeycomb structure.

First, a material metal powder is prepared using, for example, a Fe powder, an Al powder and a Cr powder, or a powder of an alloy thereof so that they give a desired composition. The material metal powder is then mixed with an organic binder (e.g. methyl cellulose or polyvinyl alcohol) and water. The resulting mixture is subjected to extrusion to obtain a honeycomb body of desired shape.

The honeycomb body is fired at 1,000–1,450° C. in a non-oxidizing atmosphere. Use of a non-oxidizing atmosphere containing hydrogen is preferable because the organic binder is decomposed and removed by the help of the catalytic action of Fe, etc. and, as a result, an excellent sintered body (a honeycomb structure) is obtained.

When the firing temperature is lower than 1,000° C., the honeycomb body is not sintered. When the firing temperature is higher than 1,450° C., the sintered body obtained is deformed.

Preferably, the honeycomb structure is coated with a heat-resistant metal oxide on the partition walls and the pore surfaces.

When the honeycomb structure is provided with electrodes (described later) to make an electrical heater, it is preferable that the honeycomb structure is provided with a resistant-adjusting means of a desired pattern between the electrodes.

Preferable examples of the resistance-adjusting means are as follows.
(1) Slits formed in desired directions, positions and lengths.
(2) Partition walls having different lengths in the passage axial direction.
(3) Partition walls of different thicknesses, or passages of different cell densities.
(4) Slits formed in partition walls.

Of these, the resistance-adjusting means (1) is particularly preferable because the portions of the honeycomb heater to be heated can be controlled as desired.

The thus obtained metallic honeycomb structure is provided with electrodes ordinarily at partition walls of the circumferential portions or inside of the structure, by brazing, welding or the like, to obtain a heater capable of generating heat when electrified (a honeycomb heater).

Incidentally, the electrodes mentioned herein refer to any terminals for applying a voltage to the honeycomb heater.

The heater is preferably formed so as to have a total resistance of 0.001–0.5Ω

The shape of honeycomb structure is not particularly restricted. But, as an example, such a specific shape is preferable that the cell density is 6–1,500 cells/in$^2$ (cpi$^2$) (0.9–233 cells/cm$^2$) and the partition wall thickness is 50–2,000 μm.

The honeycomb structure may be porous or nonporous as mentioned above and its porosity is not restricted. However, the porosity is preferably 0–50%, more preferably 5–40% in view of the strength, oxidation resistance, corrosion resistance and adhesion to catalyst-adsorbent layer.

Incidentally, in the present invention, the honeycomb structure refers to a one-piece structure having a large number of passages substantially parallel to the direction of gas flow, separated by partition walls. The sectional shape (cell shape) of each passage may be any desired one such as circular, polygonal, corrugated or the like.

Next, description is made on the method for purification of exhaust gases using the above mentioned catalyst-adsorbent.

In conducting purification of exhaust gas using the catalyst-adsorbent of the present invention, it is preferable for the maximum HC purification during cold start of the engine that an oxidizing gas such as secondary air or the like is introduced into the exhaust gas system at a site upstream of the catalyst-adsorbent for a certain length of time during cold start. The reason is as follows. Generally, the exhaust gas emitted an engine is in a fuel-rich state during cold start, because of engine operational reasons. The desorption of HC from adsorbent with an increase in exhaust gas temperature makes the exhaust gas more fuel-rich. Under such a situation, introduction of oxidizing gas can alleviate oxygen shortage (thereby, the exhaust gas composition is preferably made oxygen-excessive) and contributes to higher HC and CO purification by the catalyst. The heat generated by the purification reaction can be utilized to warm the engine more quickly.

The site of secondary air introduction is not particularly restricted as long as it is any site between the exhaust port of the engine and the catalyst-adsorbent, but is particularly preferably the vicinity of the exhaust port because good mixing is obtainable between the exhaust gas and the secondary air. The amount of secondary air introduced varies depending upon the displacement of the engine but is generally 50–300 l/min. The amount may be constant or variable. The air-fuel ratio when secondary air is introduced, is controlled at about the stoichiometric point to a lean side ($\lambda$=about 0.9–1.5). Control of air-fuel ratio particularly at a lean side of $\lambda$=about 1.0–1.3 is preferable for improved HC purification ability. The preferable timing of secondary air introduction is from the engine start to at least the start of HC desorption from adsorbent; that is, introduction is initiated within 30–40 seconds from the engine start, and is stopped within about 250 seconds from the engine start (when HC desorption from adsorbent is complete) or stopped before an $O_2$ sensor starts operation of the feed-back to the engine.

In order to maximize the purification ability during cold start of the engine, it is most preferable that the monolithic carrier of the catalyst-adsorbent is an electrical heater. In this case, electrification of the heater and introduction of secondary air are initiated after the engine start and stopped within about 60 seconds and about 100 seconds, respectively. Thereby, the purification ability for HC and CO is higher than in ordinary cases and the resulting reaction heat can be utilized for warming-up of the heater itself to the maximum extent; as a result, the electricity consumed by the heater can be reduced remarkably, the catalyst-adsorbent can show satisfactory three-way catalytic performance even during the steady-state operation after engine warm-up, and a very large effect is obtained.

Incidentally, electrification of heater may be initiated even before the engine start (e.g. 30 seconds or less before the engine start) and a good purification ability is obtained.

The oxygen-excess exhaust gas composition can also be obtained by adjusting the engine operational condition, i.e. the amount of combustion air and the amount of fuel and, in this case, a similar effect can be obtained. The adjustment can be made, for example, by a method which comprises feeding, after the ignition of engine, the fuel in an amount smaller than the theoretical amount relative to the air amount detected by an air flow sensor or the like in an open-loop control (using no $O_2$ sensor); a method which comprises controlling the air-fuel ratio by the use of an $O_2$ sensor and a computer so that the ratio is, for example, on a lean side for a certain length of time; and a method which comprises controlling the air-fuel ratio by the use of, for example, a PEGO sensor in which the sensor output linearly changes in accordance with the air-fuel ratio, so that the ratio is, for example, on a lean side for a certain length of time.

The oxygen-excess exhaust gas composition can also be obtained preferably, by using both of (1) introduction of oxidizing gas and (2) regulation of amounts of combustion air and fuel.

The present invention is hereinafter described in more detail by way of Examples. However, the present invention is in no way restricted to these Examples.

Catalyst particles and adsorbent particles were prepared according to the following procedures and used in Examples and Comparative Examples described later.

A. Preparation of Catalyst Particles (Noble Metal-loaded Heat-resistant Oxide Powders)

(1) Pd-loaded $Al_2O_3$—$CeO_2$ powder

Commercially available $\gamma$-$Al_2O_3$ having a BET specific surface area of 200 $m^2$/g was impregnated with an aqueous cerium nitrate solution so that the amount loaded (in terms of ceria) became 6% by weight. The resulting material was calcinated at 600° C. for 3 hours to obtain an alumina-ceria compound oxide. The compound oxide was pulverized by a wet method. Thereto was added a ceria powder in an amount of 20% by weight based on the amount of $\gamma$-$Al_2O_3$. There were further added an aqueous palladium nitrate solution and acetic acid. The mixture was pulverized in a ball mill for 15 hours. The resulting slurry was dried at 100° C. for 15 hours and then fired at 550° C. for 3 hours to obtain a Pd-loaded $Al_2O_3$—$CeO_2$ powder.

(2) Pd-loaded $Al_2O_3$ powder

An aqueous palladium nitrate solution and acetic acid were added to commercially available $\gamma$-$Al_2O_3$ having a BET specific surface area of 200 $m^2$/g. The mixture was pulverized in a ball mill for 15 hours to obtain a slurry. The slurry was dried at 100° C. for 15 hours and then fired at 550° C. for 3 hours to obtain a Pd-loaded $Al_2O_3$ powder.

(3) Pt-loaded $Al_2O_3$—$Ceo_2$ powder

A Pt-loaded $Al_2O_3$—$CeO_2$ powder was obtained in the same manner as in the above (1) except that an aqueous dinitrodiammine platinum solution was used in place of the aqueous palladium nitrate solution.

(4) Rh-loaded $Al_2O_3$ powder

A Rh-loaded $Al_2O_3$ powder was obtained in the same manner as in the above (2) except that an aqueous rhodium nitrate solution was used in place of the aqueous palladium nitrate solution.

(5) Rh-loaded $ZrO_2$ powder

A Rh-loaded $ZrO_2$ powder was obtained in the same manner as in the above (4) except that a commercially available partially stabilized ZrO, powder (containing 3 mole % of $Y_2O_3$ and having a BET specific surface area of 16 $m^2$/g) was used in place of $\gamma$-$A_2O_3$.

B. Preparation of Adsorbent Particles

Various zeolites shown in Table 1 were used as adsorbent particles as they were. When a desired ion(s) was (were) allowed to be present in zeolite, however, the zeolite was subjected to ion exchange or impregnation using various metal salts shown in Table 1, to prepare adsorbent particles each consisting of ion(s)-containing zeolite. The procedure of ion exchange and the procedure of impregnation are shown below.

C. Procedure of Ion Exchange

Desired amounts of a zeolite powder, a metal salt and deionized water were each weighed, and they were mixed so as to give a metal salt concentration in solution, of 0.05–0.2 mole/l. The solution was kept at 80–90° C. and subjected to ion exchange for 2 hours (per each ion exchange) with stirring. After filtration, ion exchange was conducted again with a new solution, and filtration and subsequent ion exchange with new solution was repeated 3–5 times. Then, washing was conducted with deionized water at 50° C. for 15 minutes (per each washing), followed by filtration. This washing and filtration was repeated 5–10 times. The resulting material was dried in air at 100° C. for 10 hours and then calcinated in air at 550° C. for 1 hour to obtain a zeolite powder containing a desired ion(s) loaded thereon by ion exchange.

D. Procedure of Impregnation

Desired amounts of a zeolite powder, a metal salt and deionized water were each weighed, and they were mixed so as to give a metal salt concentration in solution, of 0.05–0.2 mole/l. The solution was kept at 80–90° C. to conduct impregnation for 2 hours. Then, the resulting material was dried in air at 100° C. for 10 hours and calcinated in air at 550° C. for 1 hour to obtain a zeolite powder containing a desired ion(s) loaded thereon by impregnation.

TABLE 1

| Zeolites (before ion exchange or impregnation) | ① ZSM-5 (H type, $SiO_2/Al_2O_3$ = 20)<br>② ZSM-5 (H type, $SiO_2/Al_2O_3$ = 120)<br>③ ZSM-5 (H type, $SiO_2/Al_2O_3$ = 50)<br>④ β-zeolite (H type, $SiO_2/Al_2O_3$ = 120)<br>⑤ USY (H type, $SiO_2/Al_2O_3$ = 120) |
|---|---|

TABLE 1-continued

| Metal salts | |
|---|---|
| Acetates | $Cu(CH_3COO)_2.H_2O$, $CH_3COOAg$, $Cr(CH_3COO)_3$, $La(CH_3COO)_3.nH_2O$, $CH_3COOLi.2H_2O$, $CH_3COONa$, $Mg(CH_3COO)_2.4H_2O$, $Ba(CH_3COO)_2$ |
| Sulfates | $Ti(SO_4)_2$ |
| Others | $CuCl$, $AuCl_3.2H_2O$, $Pd(NH_3)_4Cl_2$, $Pt(NH_3)_2(NO_2)_2(NO_3)_4$, $CaCl_2$ |

EXAMPLES 1–24 AND COMPARATIVE EXAMPLES 1–3

One or a combination of the catalyst particles obtained above, the adsorbent particles composed of a commercially available zeolite powder (ZSM-5 of H type, $SiO_2/Al_2O_3$=120) and a ceria powder was mixed with appropriate amounts of acetic acid and water. Thereto was added, as necessary, an alumina sol having an alumina concentration of 2.5% by weight. The mixture was pulverized in a ball mill for 15 hours to prepare a slurry. In the slurry was dipped, one time or as necessary a plurality of times, a monolithic carrier [a cordierite honeycomb manufactured by NGK INSULATORS, LTD., outside diameter=1 in. (25.4 mm), length=2 in. (50.8 mm), rib thickness=6 mil (152 μm), cell density=400 cpi² (62 cells/cm²)] so that the amount of washcoat reached a desired loading. The coated monolithic carrier was dried and fired to form a first layer on the monolithic carrier. When a second layer (and a third layer) was (were) formed on the first layer, dipping in desired slurry, drying and firing were repeated to obtain catalyst-adsorbents of Examples 1–24 and Comparative Examples 1–3 shown in Tables 3–5.

In order to estimate the long-term life (durability) of each catalyst-adsorbent obtained above, each catalyst-adsorbent was exposed to an actual exhaust gas of 750° C. emitted from an actual engine and aged for a total of 100 hours with a fuel-cut mode. Each of the resulting catalyst-adsorbents was measured for HC light-off performance using synthetic exhaust gases (simulated engine exhaust gases). The measured HC light-off performance was expressed as HC light-off performance $T_{50\%}$ (° C.), i.e. a temperature at which the HC component present in a synthetic exhaust gas was converted by 50%. In this case, there were used, as the synthetic exhaust gas, two kinds of gases, one having a composition of nearly stoichiometric air-fuel ratio ($\lambda$=1.0) and the other having a fuel-lean composition ($\lambda$=1.3) obtained by adding 30% of air to the former gas. The value of each $T_{50\%}$ (° C.) is shown in Tables 3–5. The compositions of the synthetic exhaust gases are shown in Table 2.

TABLE 2

| | During measurement of HC light-off performance | | During measurement of HC adsorption |
|---|---|---|---|
| | $\lambda$ = 1.0 | $\lambda$ = 1.3 | $\lambda$ = 0.96 |
| Composition of synthetic exhaust gas (by volume) | | | |
| $CO_2$ | 13.2% | 10.2% | 16.0% |
| $O_2$ | 0.8% | 5.2% | 0.77% |
| CO | 0.7% | 0.5% | 2.0% |
| $H_2$ | 0.2% | 0.2% | 0.33% |
| HC | 2800 ppm C (interms of carbon) | 2200 ppm C (interms of carbon) | 4500 ppm C (interms of carbon) |
| NO | 1500 ppm | 1100 ppm | 1500 ppm |
| $H_2O$ | 10% | 10% | 10% |
| $N_2$ | Remainder | Remainder | Remainder |
| Space Velocity | 50000 $hr^{-1}$ | 65000 $hr^{-1}$ | 40000 $hr^{-1}$ |

TABLE 3

| Examples | Structure of catalyst-adsorbent and kind of catalyst | Washcoat loading (g/cc) | Noble metal loading (g/ft³) | Total Pd loading (g/ft³) | Pd concentration in Pd catalyst particle (wt %) | HC light-off performance, T50% (° C.) $\lambda$ = 1.0 | HC light-off performance, T50% (° C.) $\lambda$ = 1.3 |
|---|---|---|---|---|---|---|---|
| 1 | First layer: Zeolite | 0.18 | 0 | 150 | 5.9 | 231 | 188 |
|   | Second layer: Pd-loaded $Al_2O_3.CeO_2$ | 0.09 | 150 | | | | |
| 2 | First laryer: Pd-loaded $Al_2O_3.CeO_2$ (mixture layer) Zeolite | 0.09 0.18 | 150 0 | 150 | 5.9 | 261 | 206 |
| 3 | First layer: Zeolite | 0.18 | 0 | 150 | 5.9 | 232 | 186 |
|   | Second layer: $CeO_2$ | 0.03 | 0 | | | | |
|   | Third layer: Pd-loaded $Al_2O_3.CeO_2$ | 0.09 | 150 | | | | |
| 4 | First laryer: Pd-loaded $Al_2O_3.CeO_2$ (mixture layer) Zeolite | 0.03 0.18 | 60 0 | 150 | 5.9 | 249 | 194 |
|   | Second layer: Pd-loaded $Al_2O_3.CeO_2$ | 0.06 | 90 | | | | |
| 5 | First layer: Zeolite | 0.18 | 0 | 150 | 5.9 | 254 | 211 |
|   | Second layer: Pd-loaded $Al_2O_3.CeO_2$ | 0.09 | 150 | | | | |
|   | Third layer: Rh-loaded $Al_2O_3$ | 0.06 | 10 | | | | |
| 6 | First layer: Pd-loaded $Al_2O_3.CeO_2$ | 0.09 | 150 | 150 | 5.9 | 268 | 216 |
|   | Second layer: Zeolite | 0.18 | 0 | | | | |
| 7 | First laryer: Pd-loaded $Al_2O_3.CeO_2$ (mixture layer) Zeolite | 0.09 0.09 | 150 0 | 150 | 5.9 | 267 | 215 |
|   | Second layer: Zeolite | 0.09 | 0 | | | | |
| 8 | First layer: Rh-loaded $Al_2O_3$ | 0.06 | 10 | 150 | 5.9 | 269 | 218 |
|   | Second layer: Pd-loaded $Al_2O_3.CeO_2$ | 0.09 | 150 | | | | |
|   | Third layer: Zeolite | 0.18 | 0 | | | | |

TABLE 3-continued

| Examples | Structure of catalyst-adsorbent and kind of catalyst | Washcoat loading (g/cc) | Noble metal loading (g/ft³) | Total Pd loading (g/ft³) | Pd concentration in Pd catalyst particle (wt %) | HC light-off performance, T50% (° C.) $\lambda = 1.0$ | HC light-off performance, T50% (° C.) $\lambda = 1.3$ |
|---|---|---|---|---|---|---|---|
| 9 | First layer: Zeolite | 0.09 | 0 | 150 | 5.9 | 265 | 213 |
|   | Second layer: Pd-loaded $Al_2O_3 \cdot CeO_2$ | 0.09 | 150 | | | | |
|   | Third layer: Zeolite | 0.09 | 0 | | | | |

TABLE 4

| Examples | Structure of catalyst-adsorbent and kind of catalyst | Washcoat loading (g/cc) | Noble metal loading (g/ft³) | Total Pd loading (g/ft³) | Pd concentration in Pd catalyst particle (wt %) | HC light-off performance, T50% (° C.) $\lambda = 1.0$ | HC light-off performance, T50% (° C.) $\lambda = 1.3$ |
|---|---|---|---|---|---|---|---|
| 10 | First laryer: Pd-loaded $Al_2O_3 \cdot CeO_2$ (mixture layer) Zeolite | 0.09 0.18 | 150 0 | 150 | 5.9 | 266 | 213 |
|    | Second layer: Rh-loaded $Al_2O_3$ | 0.06 | 0 | | | | |
| 11 | First laryer: Zeolite | 0.09 | 0 | 150 | 5.9 | 260 | 205 |
|    | Second layer: Pd-loaded $Al_2O_3 \cdot CeO_2$ (mixture layer) Zeolite | 0.09 0.09 | 150 0 | | | | |
| 12 | First laryer: Zeolite | 0.18 | 0 | 150 | 5.9 | 258 | 203 |
|    | Second layer: Pd-loaded $Al_2O_3 \cdot CeO_2$ (mixture layer) Rh-loaded $Al_2O_3$ | 0.09 0.06 | 150 10 | | | | |
| 13 | First laryer: Pd-loaded $Al_2O_3 \cdot CeO_2$ (mixture layer) Rh-loaded $Al_2O_3$ | 0.09 0.06 | 150 10 | 150 | 5.9 | 262 | 208 |
|    | Zeolite | 0.18 | 0 | | | | |
| 14 | First laryer: Zeolite | 0.18 | 0 | 150 | 5.9 | 242 | 196 |
|    | Second layer: Rh-loaded $Al_2O_3$ | 0.06 | 10 | | | | |
|    | Third layer: Pd-loaded $Al_2O_3 \cdot CeO_2$ | 0.09 | 150 | | | | |
| 15 | First laryer: Rh-loaded $Al_2O_3$ (mixture layer) Zeolite | 0.06 0.18 | 10 0 | 150 | 5.9 | 245 | 198 |
|    | Second layer: Pd-loaded $Al_2O_3 \cdot CeO_2$ | 0.09 | 150 | | | | |
| 16 | First laryer: Zeolite | 0.18 | 0 | 150 | 5.9 | 240 | 195 |
|    | Second layer: Rh-loaded $ZrO_2$ | 0.06 | 10 | | | | |
|    | Third layer: Pd-loaded $Al_2O_3 \cdot CeO_2$ | 0.09 | 150 | | | | |
| 17 | First laryer: Zeolite | 0.18 | 0 | 150 | 5.9 | 240 | 191 |
|    | Second layer: Pt-loaded $Al_2O_3 \cdot CeO_2$ | 0.06 | 30 | | | | |
|    | Third layer: Pd-loaded $Al_2O_3 \cdot CeO_2$ | 0.09 | 150 | | | | |

TABLE 5

| | Structure of catalyst-adsorbent and kind of catalyst | Washcoat loading (g/cc) | Noble metal loading (g/ft³) | Total Pd loading (g/ft³) | Pd concentration in Pd catalyst particle (wt %) | HC light-off performance, T50% (° C.) $\lambda = 1.0$ | HC light-off performance, T50% (° C.) $\lambda = 1.3$ |
|---|---|---|---|---|---|---|---|
| Examples | | | | | | | |
| 18 | First laryer: Zeolite (mixture layer) $CeO_2$ | 0.18 0.03 | 0 0 | 150 | 5.9 | 232 | 186 |
|    | Second layer: Pd-loaded $Al_2O_3 \cdot CeO_2$ | 0.09 | 150 | | | | |
| 19 | First laryer: Zeolite | 0.18 | 0 | 150 | 5.9 | 235 | 189 |
|    | Second layer: $CeO_2$ | 0.03 | 0 | | | | |
|    | Third layer: Pd-loaded $Al_2O_3$ | 0.09 | 150 | | | | |
| 20 | First laryer: Zeolite | 0.18 | 0 | 150 | 5.9 | 238 | 185 |
|    | Second layer: Pd-loaded $CeO_2$ | 0.03 | 60 | | | | |
|    | Third layer: Pd-loaded $Al_2O_3 \cdot CeO_2$ | 0.06 | 90 | | | | |
| 21 | First laryer: Zeolite | 0.18 | 0 | 60 | 2.4 | 261 | 214 |
|    | Second layer: Pd-loaded $Al_2O_3 \cdot CeO_2$ | 0.09 | 60 | | | | |
| 22 | First laryer: Pd-loaded $Al_2O_3 \cdot CeO_2$ (mixture layer) Zeolite | 0.03 0.18 | 20 0 | 60 | 2.4 | 268 | 217 |
|    | Second layer: Pd-loaded $Al_2O_3$ | 0.06 | 40 | | | | |
| 23 | First laryer: Zeolite | 0.18 | 0 | 60 | 2.4 | 264 | 218 |
|    | Second layer: Pd-loaded $Al_2O_3 \cdot CeO_2$ | 0.09 | 60 | | | | |
| 24 | First laryer: Zeolite | 0.18 | 0 | 8 | 2.4 | 273 | 220 |
|    | Second layer: Rh-loaded $Al_2O_3$ | 0.06 | 10 | | | | |
|    | Third layer: Pd-loaded $Al_2O_3 \cdot CeO_2$ | 0.012 | 8 | | | | |

TABLE 5-continued

| Structure of catalyst-adsorbent and kind of catalyst | Washcoat loading (g/cc) | Noble metal loading (g/ft³) | Total Pd loading (g/ft³) | Pd concentration in Pd catalyst particle (wt %) | HC light-off performance, T50% (° C.) | |
|---|---|---|---|---|---|---|
| | | | | | λ = 1.0 | λ = 1.3 |
| Comparative Examples | | | | | | |
| 1 First laryer: Zeolite | 0.18 | 0 | 40 | 1.6 | 275 | 222 |
| Second layer: Rh-loaded Al₂O₃ | 0.06 | 10 | | | | |
| Third layer: Pd-loaded Al₂O₃.CeO₂ | 0.09 | 40 | | | | |
| 2 First laryer: Zeolite | 0.18 | 0 | 40 | 1.6 | 273 | 221 |
| Second layer: Pd-loaded Al₂O₃.CeO₂ | 0.09 | 40 | | | | |
| 3 First laryer: Pd-loaded Al₂O₃.CeO₂ | 0.09 | 40 | 40 | 1.6 | 279 | 225 |
| (mixture layer) Zeolite | 0.18 | 0 | | | | |

As shown in Tables 3–5, there were investigated the effects of the structures of catalyst-adsorbents and the kinds of catalysts when the adsorbent was H type ZSM-5 ($SiO_2$/$Al_2O_3$=120), on the performances of the resulting catalyst-adsorbents. As a result, the catalyst-adsorbents of Examples 1–24 containing Pd catalyst particles each comprising a heat-resistant inorganic oxide and 2–30% by weight, based on the inorganic oxide, of Pd loaded thereon, as compared with catalyst-adsorbents of Comparative Examples 1–3 containing catalyst particles comprising a heat-resistant inorganic oxide and less than 2% by weight, based on the inorganic oxide, of Pd loaded thereon, were superior in HC light-off performance and had sufficient durability. Of the catalyst-adsorbents of Examples 1–24, those in which at least part of the above-mentioned Pd catalyst particles were exposed on the surface of the catalyst-adsorbent layer (i.e. those in which the outermost layer was a mixture layer containing a Pd-loaded $Al_2O_3$—$CeO_2$ powder) and those in which the catalyst-adsorbent layer had, on the surface, a Pd surface layer containing only the above-mentioned Pd catalyst particles (i.e. those in which the outermost layer was composed of a Pd-loaded $Al_2O_3$—$CeO_2$ powder alone), showed particularly good HC light-off performances at λ=1.3 (a synthetic exhaust gas of lean side containing secondary air).

EXAMPLES 25–75

Catalyst-adsorbents of Examples 25–75 shown in Tables 6–7 were obtained by using the same catalyst-adsorbent structures and catalyst kinds as used in Examples 1–5 and using, as the adsorbents, various ion(s)-containing zeolite powders prepared by the above-mentioned ion exchange or impregnation, in place of the zeolite powder (H type ZSM-5, $SiO_2$/$Al_2O_3$=120) containing no ion, used in Examples 1–5. In Tables 6–7, the catalyst-adsorbent structures and catalyst kinds used in Examples 1–5 are expressed as type A (Example 1), type B (Example 2), type C (Example 3), type D (Example 4) and type E (Example 5); and their schematic sectional views are shown in FIGS. 1(A), 1(B), 1(C), 1(D) and 1(E), respectively. In FIGS. 1(A) to 1(E), 1 indicates a Pd-loaded $Al_2O_3$—$CeO_2$ powder (Pd catalyst particles); 2 indicates a zeolite powder (adsorbent particles); 3 indicates a layer consisting of a Pd-loaded $Al_2O_3$—$CeO_2$ powder alone (a Pd surface layer); 4 indicates a layer consisting of a Rh-loaded $Al_2O_3$ powder alone; and 5 indicates a layer consisting of a zeolite powder alone; and 6 indicates a layer consisting of $CeO_2$ powder alone.

Examples 42 and 43 are tests conducted for examining the effect of the form of ion coordination on adsorptivity. In the adsorbent of Example 42, ion exchange was made using copper acetate so that the proportion of ions of square planar coordination (relative to the oxygen in zeolite framework) in total ions coordinated became high (82%); in the adsorbent of Example 43, ion exchange was made using copper nitrate so that the above proportion became 43%. Incidentally, the form of ion coordination was determined by the method using ESR described in "$Cu^{2+}$-cation location and reactivity in modernite and ZSM-5: e.s.r. study", A. V. KLucherov, ZEOLITES, Vol. 5 (1985).

The above-obtained catalyst-adsorbents were subjected to aging in the same manner as in Examples 1–24 and Comparative Examples 1–3 and then measured for HC light-off performance and HC adsorption. HC light-off performance was expressed as light-off performance $T_{50\%}$ (° C.), as in Examples 1–24 and Comparative Examples 1–3. With respect to HC adsorption, the proportion (%) of HC adsorbed was measured at temperatures of 40° C., 200° C. and 300° C., using a synthetic exhaust gas of λ=0.96 (a simulated exhaust gas for the exhaust gas emitted from engine during cold start). The results are shown in Tables 6–7. Incidentally, the composition, etc. of the synthetic exhaust gas used are shown in Table 2.

TABLE 6

| | Type of adsorbent (ion-containing zeolite) | | | | | | HC adsorptivity | | | | |
|---|---|---|---|---|---|---|---|---|---|---|---|
| Examples | Type (1) | Kind of ion(s) | Kind of zeolite (2) | Preparation method | Amount of ion (% based on Al in zeolite) | Electro-negativity | Hardness of acid (3) | (%) Inlet gas temp. (° C.) | | | HC light-off performance, T50% (° C.) |
| | | | | | | | | 40 | 200 | 300 | λ = 1.0  λ = 1.3 |
| 25 | A | H* | ① | — | (100) | 2.1 | H | 70 | 35 | 21 | 237   193 |
| 26 | A | H* | ② | — | (100) | 2.1 | H | 77 | 41 | 28 | 231   188 |
| 27 | A | H* | ③ | — | (100) | 2.1 | H | 80 | 43 | 30 | 235   191 |

TABLE 6-continued

| | | Type of adsorbent (ion-containing zeolite) | | | | | HC adsorptivity | | | | |
|---|---|---|---|---|---|---|---|---|---|---|---|
| | | Kind | | | | | (%) | | | HC light-off | |
| | Kind | of | | Amount of ion | | Hardness | Inlet gas temp. | | | performance, | |
| | Type of | zeolite | Preparation | (% based on Al in | Electro- | of acid | (° C.) | | | T50% (° C.) | |
| Examples | (1) ion(s) | (2) | method | zeolite) | negativity | (3) | 40 | 200 | 300 | λ = 1.0 | λ = 1.3 |
| 28 | A H* | ④ | — | (100) | 2.1 | H | 79 | 46 | 30 | 230 | 189 |
| 29 | A H* | ⑤ | — | (100) | 2.1 | H | 72 | 40 | 29 | 232 | 190 |
| 30 | A Li* | ② | ion exchange | 83 | 1.0 | H | 62 | 30 | 20 | 235 | 192 |
| 31 | A La$^{5+}$ | ③ | ion exchange | 3 | 1.1 | H | 67 | 33 | 22 | 233 | 189 |
| 32 | A Cr$^{3+}$ | ③ | ion exchange | 46 | 1.5 | H | 74 | 36 | 26 | 232 | 188 |
| 33 | A Ti$^{4+}$ | ③ | impregnation | 99 | 1.5 | H | 73 | 37 | 26 | 234 | 190 |
| 34 | A Cu$^{2+}$ | ③ | ion exchange | 45 | 1.9 | I | 82 | 53 | 50 | 226 | 186 |
| 35 | A Cu$^+$ | ② | impregnation | 123 | 1.9 | S | 77 | 49 | 46 | 228 | 188 |
| 36 | A Ag$^+$ | ③ | ion exchange | 60 | 1.9 | S | 86 | 55 | 45 | 232 | 188 |
| 37 | A Ag$^+$ | ② | ion exchange | 58 | 1.9 | S | 90 | 57 | 46 | 231 | 187 |
| 38 | A Ag$^+$ | ③ | impregnation | 59 | 1.9 | S | 81 | 49 | 38 | 232 | 189 |
| 39 | A Au$^{3+}$ | ④ | ion exchange | 90 | 2.4 | S | 83 | 58 | 42 | 230 | 186 |
| 40 | A Cu$^{2+}$ | ④ | ion exchange | 80 | 1.9 | I | 90 | 68 | 62 | 224 | 185 |
| 41 | A Cu$^{2+}$ | ⑤ | ion exchange | 78 | 1.9 | I | 79 | 49 | 46 | 226 | 187 |
| 42 | A Cu$^{2+}$ | ② | ion exchange | 60 | 1.9 | I | 85 | 57 | 54 | 225 | 186 |
| 43 | A Cu$^{2+}$ | ② | ion exchange | 58 | 1.9 | I | 80 | 51 | 49 | 227 | 187 |
| 44 | A Pd$^{2+}$ | ② | ion exchange | 98 | 2.2 | S | 80 | 60 | 65 | 217 | 173 |
| 45 | A Pt$^{4+}$ | ② | impregnation | 94 | 2.2 | S | 77 | 50 | 62 | 223 | 180 |
| 46 | A Ag$^+$, Cu$^{2+}$ | ② | ion exchange, ion exchange | 48, 43 | 1.9, 1.9 | S, I | 94 | 69 | 70 | 226 | 186 |
| 47 | A Ag$^+$, Pd$^{2+}$ | ② | impregnation, impregnation | 52, 28 | 1.9, 2.2 | S, S | 87 | 60 | 63 | 221 | 178 |
| 48 | A Ag$^+$, Pd$^{2+}$ | ② | ion exchange, impregnation | 48, 31 | 1.9, 2.2 | S, S | 93 | 63 | 65 | 220 | 178 |
| 49 | A Ag$^+$, Pd$^{2+}$ | ② | ion exchange, ion exchange | 48, 30 | 1.9, 2.2 | S, S | 93 | 67 | 69 | 219 | 176 |
| 50 | A Ag$^+$, Pd$^{2+}$ | ② | ion exchange, ion exchange | 48, 45 | 1.9, 2.2 | S, S | 94 | 70 | 72 | 215 | 175 |

(1) Structure of catalyst and adsorbent and kind of catalyst
(2) Refer to Table 1
(3) H: hard acid, S: soft acid, I: intermediate acid

TABLE 7

| | | Type of adsorbent (ion-containing zeolite) | | | | | HC adsorptivity | | | | |
|---|---|---|---|---|---|---|---|---|---|---|---|
| | | Kind | | | | | (%) | | | HC light-off | |
| | Kind | of | | Amount of ion | | Hardness | Inlet gas temp. | | | performance, | |
| | Type of | zeolite | Preparation | (% based on Al in | Electro- | of acid | (° C.) | | | T50% (° C.) | |
| Examples | (1) ion(s) | (2) | method | zeolite) | negativity | (3) | 40 | 200 | 300 | λ = 1.0 | λ = 1.3 |
| 51 | A Ag$^+$, Pd$^{2+}$ | ② | ion exchange, ion exchange | 48, 2 | 1.9, 2.2 | S, S | 92 | 60 | 51 | 223 | 179 |
| 52 | A Ag$^+$, Ca$^{2+}$ | ② | ion exchange, ion exchange | 95, 3 | 1.9, 1.0 | S, H | 94 | 62 | 50 | 230 | 185 |
| 53 | A Cu$^{2+}$, Mg$^{2+}$ | ② | ion exchange, ion exchange | 70, 2 | 1.9, 1.2 | I, H | 93 | 66 | 65 | 224 | 185 |
| 54 | A Au$^{3+}$, Cr$^{3+}$ | ② | ion exchange, ion exchange | 46, 30 | 2.4, 1.5 | S, H | 90 | 64 | 49 | 229 | 185 |
| 55 | A Na$^+$, Ba$^{2+}$ | ② | ion exchange, ion exchange | 78, 20 | 0.9, 0.9 | H, H | 67 | 34 | 23 | 236 | 191 |
| 56 | B H$^+$ | ② | — | (100) | 2.1 | H | 81 | 44 | 32 | 261 | 206 |
| 57 | C H$^+$ | ② | — | (100) | 2.1 | H | 75 | 38 | 26 | 232 | 186 |
| 58 | D H$^+$ | ② | — | (100) | 2.1 | H | 79 | 42 | 30 | 249 | 194 |
| 59 | E H$^+$ | ② | — | (100) | 2.1 | H | 77 | 40 | 29 | 254 | 211 |
| 60 | B Ag$^+$ | ② | ion exchange | 60 | 1.9 | S | 93 | 61 | 50 | 263 | 206 |
| 61 | C Ag$^+$ | ② | ion exchange | 60 | 1.9 | S | 87 | 55 | 43 | 231 | 187 |
| 62 | D Ag$^+$ | ② | ion exchange | 60 | 1.9 | S | 91 | 59 | 47 | 249 | 193 |
| 63 | E Ag$^+$ | ② | ion exchange | 60 | 1.9 | S | 89 | 58 | 45 | 254 | 212 |
| 64 | B Ag$^+$, Cu$^{2+}$ | ② | ion exchange, ion exchange | 48, 43 | 1.9, 1.9 | S, I | 97 | 73 | 73 | 254 | 204 |
| 65 | C Ag$^+$, Cu$^{2+}$ | ② | ion exchange, ion exchange | 48, 43 | 1.9, 1.9 | S, I | 91 | 67 | 67 | 226 | 186 |
| 66 | D Ag$^+$, Cu$^{2+}$ | ② | ion exchange, ion exchange | 48, 43 | 1.9, 1.9 | S, I | 95 | 71 | 71 | 243 | 194 |
| 67 | E Ag$^+$, Cu$^{2+}$ | ② | ion exchange, ion exchange | 48, 43 | 1.9, 1.9 | S, I | 93 | 69 | 71 | 249 | 210 |
| 68 | B Ag$^+$, Pd$^{2+}$ | ② | ion exchange, ion exchange | 48, 45 | 1.9, 2.2 | S, S | 98 | 73 | 76 | 244 | 191 |
| 69 | C Ag$^+$, Pd$^{2+}$ | ② | ion exchange, ion exchange | 48, 45 | 1.9, 2.2 | S, S | 92 | 67 | 70 | 216 | 175 |
| 70 | D Ag$^+$, Pd$^{2+}$ | ② | ion exchange, ion exchange | 48, 45 | 1.9, 2.2 | S, S | 96 | 71 | 74 | 230 | 180 |
| 71 | E Ag$^+$, Pd$^{2+}$ | ② | ion exchange, ion exchange | 48, 45 | 1.9, 2.2 | S, S | 95 | 69 | 73 | 237 | 197 |
| 72 | B Cu$^{2+}$, Mg$^{2+}$ | ② | ion exchange, ion exchange | 70, 22 | 1.9, 2.2 | S, S | 96 | 70 | 68 | 223 | 202 |
| 73 | C Cu$^{2+}$, Mg$^{2+}$ | ② | ion exchange, ion exchange | 70, 22 | 1.9, 2.2 | S, S | 90 | 64 | 62 | 225 | 185 |
| 74 | D Cu$^{2+}$, Mg$^{2+}$ | ② | ion exchange, ion exchange | 70, 22 | 1.9, 2.2 | S, S | 94 | 68 | 66 | 241 | 191 |
| 75 | E Cu$^{2+}$, Mg$^{2+}$ | ② | ion exchange, ion exchange | 70, 22 | 1.9, 2.2 | S, S | 92 | 67 | 64 | 246 | 207 |

(1) Structure of catalyst and adsorbent and kind of catalyst
(2) Refer to Table 1
(3) H: hard acid, S: soft acid, I: intermediate acid In Examples 25–55, various adsorbents were investigated using, as the catalyst-adsorbent structure and the catalyst kind, the type A which was used in Example 1 and which showed excellent HC light-off performance. As a result, when there were used adsorbents each made of zeolite containing an ion(s) (including $H^+$ type) of an element(s) having an electronegativity of 1.40 or more, the HC adsorptivities were good up to the catalyst light-off temperatures. When there were used adsorbents each made of zeolite containing a soft or intermediate acid ion(s), particularly an ion(s) of 1B group element(s), the HC adsorptivities at high temperatures were high. When there were used adsorbents each containing a second ion (e.g. $Mg^{2+}$ or $Ca^{2+}$) for higher heat resistance, the adsorptivities were even higher. When there were used adsorbents each containing a noble metal ion, improvement was seen also in light-off performance.

In Examples 56–75, various adsorbents were combined with other types B to E (other catalyst-adsorbent structures and catalyst kinds). As a result, also in combination with any of the types B to E, good HC adsorptivity was obtained up to the catalyst light-off temperature. Excellent HC adsorptivity was obtained particularly in the type B in which part of the adsorbent particles was exposed on the catalyst-adsorbent layer.

EXAMPLES 76–98 AND COMPARATIVE EXAMPLES 4–6

Catalyst-adsorbents each using an electrical heater (a honeycomb heater) as the monolithic carrier were prepared according to the following procedure and evaluated.

A pure Fe powder, a pure Cr powder, a Fe-50 wt. % Al alloy powder, a Fe-20 wt. % B powder and a Fe-75 wt. % Si powder were compounded so as to give a composition of Fe-20Cr-5Al-1Si-0.05B (wt. %). Thereto were added an organic binder (methyl cellulose), an antioxidant (oleic acid) and water to prepare a readily formable bullet. The bullet was subjected to extrusion to obtain a honeycomb comprising square cells. The honeycomb was dried and then fired at 1,350° C. in a $H_2$ atmosphere to obtain honeycomb structures each having an outside diameter of 90 mm, a length of 40 mm, a rib thickness of 4 mil (102 μm) and a cell density of 400 $cpi^2$ (62 cells/$cm^2$).

Figure 1:
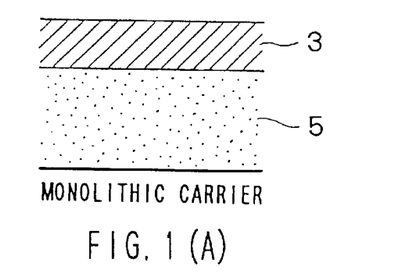
FIGS. 1(A) to 1(E) show fragmentary sectional views of typical embodiments of the present catalyst-adsorbent.
Figure 2:
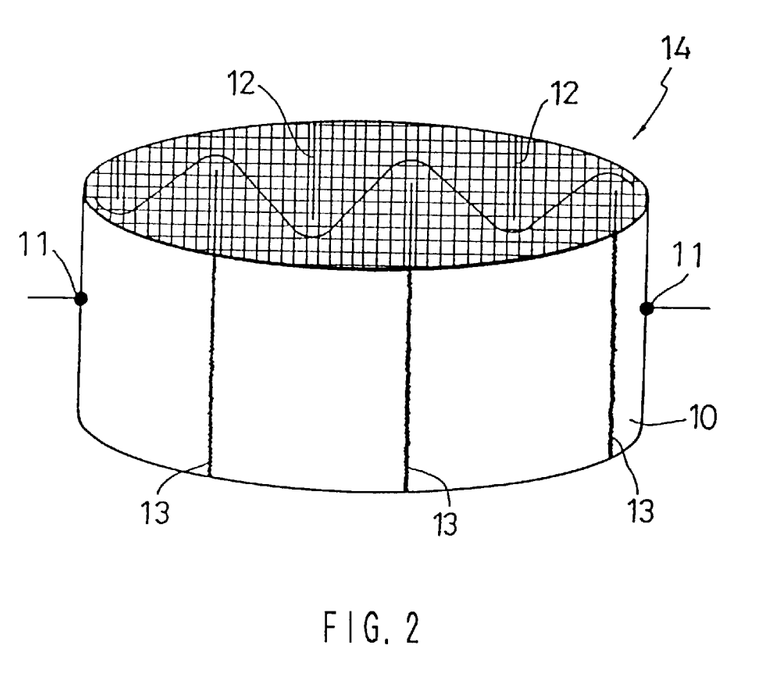
FIG. 2 shows an example of a honeycomb heater.

As shown in FIG. 2, each honeycomb structure was provided, on the side wall 10, with two electrodes 11. As also shown in FIG. 2, six slits 12 each having a length of 70 mm (the two outermost slits each had a length of 50 mm) were formed in each honeycomb structure so that they were parallel to the passage axial direction and the number of cells between the two adjacent slits became 7 (about 10 mm). Further, the circumferential portion 13 of each slit 12 was filled with an inorganic adhesive made of heat-resistant $ZrO_2$, to form an insulation portion. Thus, honeycomb heaters 14 were produced.

On each honeycomb heater was (were) formed a layer(s) in the same manner as in Examples 1–24 and Comparative Examples 1–3, to obtain catalyst-adsorbents of Examples 76–98 and Comparative Examples 4–6 shown in Tables 8–10.

Each of the catalyst-adsorbents obtained above was placed just before a commercially available three-way catalyst [volume 0.6 l; outside diameter=3.66 in. (93 mm); rib thickness=6 mil (152 μm); cell density=400 $cpi^2$ (62 cells/$cm^2$); Pt—Rh loaded on a cordierite carrier], and aged in the same manner as in Examples 1–24 and Comparative Examples 1–3. The resulting catalyst-adsorbent was mounted in a car with an in-line four-cylinder engine of 2,000 cc displacement, and subjected to the FTP test. In this test, the catalyst-adsorbent was mounted at a manifold position which was 350 mm distant from the engine exhaust port. Also at a position 1,200 mm distant from the engine exhaust port, there was mounted a 1.3-l commercially available three-way catalyst which had been aged in the same manner as above. The heater (the monolithic carrier of the catalyst-adsorbent) was electrified by an electric power of 2 kW for 30 seconds after the engine start. Secondary air was introduced at a position 100 mm before the catalyst-adsorbent at a rate of 160 l/min for 100 seconds after the engine start to maintain an atmosphere of $\lambda$=1.0–1.3. The results of the FTP test are shown in Tables 8–10.

EXAMPLE 99

The same catalyst-adsorbent as used in Example 86 was aged in the same manner as in Examples 76–98 and Comparative Examples 4–6 and then subjected to the FTP test. However, no secondary air was introduced; instead, the amount of combustion air was detected using a mass flow sensor and the exhaust gas composition was shifted to a lean side for 100 seconds after the engine start. During this period, the exhaust gas was at $\lambda$=1.0–1.05. The results of the FTP test are shown in Table 11.

EXAMPLE 100

The same catalyst-adsorbent as used in Example 86 was aged in the same manner as in Examples 76–98 and Comparative Examples 4–6 and then subjected to the FTP test. However, neither secondary air introduction nor exhaust gas shifting to lean side was conducted, and an ordinary driving operation was employed. The results of the FTP test are shown in Table 11.

TABLE 8

| Examples | Structure of catalyst-adsorbent and kind of catalyst and adsorbent | Washcoat loading (g/cc) | Noble metal loading (g/ft³) | Total Pd loading (g/ft³) | Pd concentration in Pd catalyst particle (wt %) | $SiO_2$/$Al_2O_3$ ratio | Amount of ion (% based on Al in zeolite) | FTP Total emission CO | HC | $NO_x$ |
|---|---|---|---|---|---|---|---|---|---|---|
| 76 | First layer: H type ZSM-5 | 0.18 | 0 | 150 | 5.9 | 120 | (100) | 0.841 | 0.072 | 0.345 |
|  | Second layer: Pd-loaded $Al_2O_3$.$CeO_2$ | 0.09 | 150 |  |  |  |  |  |  |  |
| 77 | First layer: H type ZSM-5 | 0.09 | 0 | 300 | 5.9 | 120 | (100) | 0.562 | 0.061 | 0.330 |
|  | Second layer: Pd-loaded $Al_2O_3$.$CeO_2$ | 0.18 | 300 |  |  |  |  |  |  |  |
| 78 | First layer: H type ZSM-5 | 0.24 | 0 | 50 | 5.9 | 120 | (100) | 0.104 | 0.078 | 0.376 |
|  | Second layer: Pd-loaded $Al_2O_3$.$CeO_2$ | 0.03 | 50 |  |  |  |  |  |  |  |
| 79 | First layer: Ag ion-exchanged ZSM-5 | 0.18 | 0 | 150 | 5.9 | 120 | 58 | 0.830 | 0.062 | 0.347 |
|  | Second layer: Pd-loaded $Al_2O_3$.$CeO_2$ | 0.09 | 150 |  |  |  |  |  |  |  |

TABLE 8-continued

| Examples | Structure of catalyst-adsorbent and kind of catalyst and adsorbent | Washcoat loading (g/cc) | Noble metal loading (g/ft³) | Total Pd loading (g/ft³) | Pd concentration in Pd catalyst particle (wt %) | SiO₂/—Al₂O₃ ratio | Amount of ion (% based on Al in zeolite) | FTP Total emission CO | HC | NOₓ |
|---|---|---|---|---|---|---|---|---|---|---|
| 80 | First layer: Pd-loaded Al₂O₃.CeO₂ (mixture layer) Ag ion-exchanged ZSM-5 | 0.09 0.18 | 150 0 | 150 | 5.9 | 120 | 58 | 1.016 | 0.070 | 0.362 |
| 81 | First layer: Ag ion-exchanged ZSM-5 Second layer: CeO₂ Third layer: Pd-loaded Al₂O₃.CeO₂ | 0.18 0.03 0.09 | 0 0 150 | 150 | 5.9 | 120 | 58 | 0.801 | 0.060 | 0.334 |
| 82 | First layer: Pd-loaded Al₂O₃.CeO₂ (mixture layer) Ag ion-exchanged ZSM-5 Second layer: Pd-loaded Al₂O₃.CeO₂ | 0.03 0.18 0.06 | 60 0 90 | 150 | 5.9 | 120 | 58 | 0.894 | 0.064 | 0.352 |
| 83 | First layer: Ag ion-exchanged ZSM-5 Second layer: Rh-loaded Al₂O₃ Third layer: Pd-loaded Al₂O₃.CeO₂ | 0.18 0.06 0.09 | 0 10 150 | 150 | 5.9 | 120 | 58 | 0.948 | 0.065 | 0.335 |

TABLE 9

| Examples | Structure of catalyst-adsorbent and kind of catalyst and adsorbent | Washcoat loading (g/cc) | Noble metal loading (g/ft³) | Total Pd loading (g/ft³) | Pd concentration in Pd catalyst particle (wt %) | SiO₂/—Al₂O₃ ratio | Amount of ion (% based on Al in zeolite) | FTP Total emission CO | HC | NOₓ |
|---|---|---|---|---|---|---|---|---|---|---|
| 84 | First layer: Ag and Pd ions-exchanged ZSM-5 Second layer: Pd-loaded Al₂O₃.CeO₂ | 0.18 0.09 | 49 150 | 199 | 5.9 | 120 | 48, 45 (Ag⁺) (Pd²⁺) | 0.426 | 0.045 | 0.325 |
| 85 | First layer: Pd-loaded Al₂O₃.CeO₂ (mixture layer) Ag and Pd ions-exchanged ZSM-5 | 0.09 0.18 | 150 49 | 199 | 5.9 | 120 | 48, 45 (Ag⁺) (Pd²⁺) | 0.625 | 0.051 | 0.344 |
| 86 | First layer: Ag and Pd ions-exchanged ZSM-5 Second layer: CeO₂ Third layer: Pd-loaded Al₂O₃.CeO₂ | 0.18 0.03 0.09 | 49 0 150 | 199 | 5.9 | 120 | 48, 45 (Ag⁺) (Pd²⁺) | 0.418 | 0.043 | 0.313 |
| 87 | First layer: Pd-loaded Al₂O₃.CeO₂ (mixture layer) Ag and Pd ions-exchanged ZSM-5 Second layer: Pd-loaded Al₂O₃.CeO₂ | 0.03 0.18 0.06 | 60 49 90 | 199 | 5.9 | 120 | 48, 45 (Ag⁺) (Pd²⁺) | 0.523 | 0.048 | 0.329 |
| 88 | First layer: Ag and Pd ions-exchanged ZSM-5 Second layer: Rh-loaded Al₂O₃ Third layer: Pd-loaded Al₂O₃.CeO₂ | 0.18 0.06 0.09 | 49 10 150 | 199 | 5.9 | 120 | 48, 45 (Ag⁺) (Pd²⁺) | 0.583 | 0.048 | 0.314 |
| 89 | First layer: Cu and Mg ions-exchanged ZSM-5 Second layer: Pd-loaded Al₂O₃.CeO₂ | 0.18 0.09 | 0 150 | 150 | 5.9 | 120 | 70, 22 (Cu²⁺) (Mg²⁺) | 0.612 | 0.052 | 0.327 |
| 90 | First layer: Pd-loaded Al₂O₃.CeO₂ (mixture layer) Cu and Mg ions-exchanged ZSM-5 | 0.09 0.18 | 150 0 | 150 | 5.9 | 120 | 70, 22 (Cu²⁺) (Mg²⁺) | 0.810 | 0.059 | 0.341 |
| 91 | First layer: Cu and Mg ions-exchanged ZSM-5 Second layer: CeO₂ Third layer: Pd-loaded Al₂O₃.CeO₂ | 0.18 0.03 0.09 | 0 0 150 | 150 | 5.9 | 120 | 70, 22 (Cu²⁺) (Mg²⁺) | 0.598 | 0.051 | 0.311 |
| 92 | First layer: Pd-loaded Al₂O₃.CeO₂ (mixture layer) Cu and Mg ions-exchanged ZSM-5 Second layer: Pd-loaded Al₂O₃.CeO₂ | 0.03 0.18 0.06 | 60 0 90 | 150 | 5.9 | 120 | 70, 22 (Cu²⁺) (Mg²⁺) | 0.673 | 0.055 | 0.336 |
| 93 | First layer: Cu and Mg ions-exchanged ZSM-5 Second layer: Rh-loaded Al₂O₃ Third layer: Pd-loaded Al₂O₃.CeO₂ | 0.18 0.06 0.09 | 0 6.7 150 | 150 | 5.9 | 120 | 70, 22 (Cu²⁺) (Mg²⁺) | 0.733 | 0.056 | 0.318 |

TABLE 10

| Examples | Structure of catalyst-adsorbent and kind of catalyst and adsorbent | Washcoat loading (g/cc) | Noble metal loading (g/ft³) | Total Pd loading (g/ft³) | Pd concentration in Pd catalyst particle (wt %) | SiO₂/—Al₂O₃ ratio | Amount of ion (% based on Al in zeolite) | FTP Total emission CO | HC | NOₓ |
|---|---|---|---|---|---|---|---|---|---|---|
| 94 | First layer: Ag and Cu ions-exchanged ZSM-5 Second layer: Pd-loaded Al₂O₃.CeO₂ | 0.18 0.09 | 0 150 | 150 | 5.9 | 120 | 48, 43 (Ag⁺) (Cu²⁺) | 0.642 | 0.050 | 0.330 |

TABLE 10-continued

| | Structure of catalyst-adsorbent and kind of catalyst and adsorbent | Washcoat loading (g/cc) | Noble metal loading (g/ft$^3$) | Total Pd loading (g/ft$^3$) | Pd concentration in Pd catalyst particle (wt %) | SiO$_2$/— Al$_2$O$_3$ ratio | Amount of ion (% based on Al in zeolite) | FTP Total emission | | |
|---|---|---|---|---|---|---|---|---|---|---|
| | | | | | | | | CO | HC | NO$_x$ |
| 95 | First layer: Pd-loaded Al$_2$O$_3$.CeO$_2$ (mixture layer) Ag and Cu ions-exchanged ZSM-5 | 0.09 0.18 | 150 0 | 150 | 5.9 | 120 | 48, 43 (Ag$^+$) (Cu$^{2+}$) | 0.799 | 0.055 | 0.345 |
| 96 | First layer: Ag and Cu ions-exchanged ZSM-5 Second layer: CeO$_2$ Third layer: Pd-loaded Al$_2$O$_3$.CeO$_2$ | 0.18 0.03 0.09 | 0 0 150 | 150 | 5.9 | 120 | 48, 43 (Ag$^+$) (Cu$^{2+}$) | 0.602 | 0.047 | 0.317 |
| 97 | First layer: Pd-loaded Al$_2$O$_3$.CeO$_2$ (mixture layer) Ag and Cu ions-exchanged ZSM-5 Second layer: Pd-loaded Al$_2$O$_3$.CeO$_2$ | 0.03 0.18 0.06 | 60 0 90 | 150 | 5.9 | 120 | 48, 43 (Ag$^+$) (Cu$^{2+}$) | 0.687 | 0.054 | 0.340 |
| 98 | First layer: Ag and Cu ions-exchanged ZSM-5 Second layer: Rh-loaded Al$_2$O$_3$ Third layer: Pd-loaded Al$_2$O$_3$.CeO$_2$ | 0.18 0.06 0.09 | 0 6.7 150 | 150 | 5.9 | 120 | 48, 43 (Ag$^+$) (Cu$^{2+}$) | 0.753 | 0.054 | 0.317 |
| Comparative Examples | | | | | | | | | | |
| 4 | First layer: Pd-loaded Al$_2$O$_3$.CeO$_2$ | 0.09 | 150 | 150 | 5.9 | — | — | 0.843 | 0.089 | 0.346 |
| 5 | First layer: Ag and Pd ions-exchanged ZSM-5 | 0.18 | 49 | 49 | — | 120 | 48, 45 (Ag$^+$) (Pd$^{2+}$) | 1.119 | 0.087 | 0.391 |
| 6 | First layer: Ag and Pd ions-exchanged ZSM-5 Second layer: Pd-loaded Al$_2$O$_3$.CeO$_2$ | 0.18 0.09 | 49 40 | 89 | 1.6 | 120 | 48, 45 (Ag$^+$) (Pd$^{2+}$) | 1.093 | 0.083 | 0.388 |

TABLE 11

| | FTP total emission | | |
|---|---|---|---|
| | CO | HC | NOx |
| Example 99 | 0.453 | 0.046 | 0.310 |
| Example 100 | 0.649 | 0.055 | 0.307 |

As is clear from Tables 8–11, the catalyst-adsorbents of Examples 76–100 all of the present invention, as compared with that of Comparative Example 4 containing no adsorbent, that of Comparative Example 5 containing no catalyst and that of Comparative Example 6 containing catalyst particles each comprising a heat-resistant inorganic oxide and less than 2% by weight, based on the inorganic oxide, of Pd loaded thereon, showed excellent purification abilities to all harmful components of CO, HC and NOx and showed particularly striking effects in HC purification. Further, introduction of secondary air and regulation of amounts of combustion air and fuel were effective for purification of CO and HC.

As described above, the catalyst-adsorbent of the present invention can effectively purify harmful substances present in exhaust gases, particularly HC generated in a large amount during cold start of the engine.

What is claimed is:

1. A catalyst-adsorbent for purification of exhaust gases, comprising a monolithic carrier and a catalyst-adsorbent layer formed thereon, said catalyst-adsorbent layer comprising a catalyst for reduction of carbon monoxide, hydrocarbons and nitrogen oxides emitted from an internal combustion engine and an adsorbent for reduction of hydrocarbons emitted during cold start of the engine, said catalyst comprising catalyst particles each including a heat-resistant inorganic oxide and at least one noble metal selected from the group consisting of Pt, Pd and Rh, loaded thereon, said catalyst at least containing catalyst particles each comprising a heat-resistant inorganic oxide and 2–30% by weight, based on said oxide, of only Pd loaded thereon, wherein at least part of said Pd-loaded catalyst particles are in the vicinity of the outer surface of said catalyst-adsorbent layer and the content of Pd in the catalyst is 50 to 300 g/ft$^3$ of the catalyst-adsorbent, and said adsorbent comprising zeolite adsorbent particles.

2. A catalyst-adsorbent according to claim 1, wherein at least part of said Pd-loaded catalyst particles is present in a portion of the catalyst-adsorbent layer ranging from the surface thereof to the midpoint of the thickness thereof.

3. A catalyst-adsorbent according to claim 1, wherein at least part of said Pd-loaded catalyst particles a is exposed at the surface of the catalyst-adsorbent layer.

4. A catalyst-adsorbent according to claim 1, wherein the heat-resistant inorganic oxide comprises active alumina.

5. A catalyst-adsorbent according to claim 1, wherein the heat-resistant inorganic oxide comprises zirconia.

6. A catalyst-adsorbent according to claim 1, wherein the heat-resistant inorganic oxide comprises active alumina and zirconia.

7. A catalyst-adsorbent according to claim 1, wherein the heat-resistant inorganic oxide further comprises a rare earth element oxide.

8. A catalyst-adsorbent according to claim 1, wherein the heat-resistant inorganic oxide further comprises a compound oxide of rare earth element oxides.

9. A catalyst-adsorbent according to claim 1, wherein the heat-resistant inorganic oxide further comprises a compound oxide of a rare earth element oxide and zirconia.

10. A catalyst-adsorbent according to claim 1, wherein the SiO$_2$/Al$_2$O$_3$ molar ratio of the zeolite is 40 or more.

11. A catalyst-adsorbent according to claim 1, wherein the zeolite is selected from the group consisting of ZSM-5, USY and β-zeolite.

12. A catalyst-adsorbent according to claim 1, wherein the zeolite contains an ion of at least one element having an electronegativity of 1.40 or more.

13. A catalyst-adsorbent according to claim 12, wherein the ion has square planar coordination to the oxygen in zeolite framework.

14. A catalyst-adsorbent according to claim 12, wherein the ion content in zeolite is 20% by weight or more based on the Al atoms in zeolite.

15. A catalyst-adsorbent according to claim 12, wherein the zeolite further contains at least one ion selected from the group consisting of Mg, Ca, Sr, Ba, Y, La, Ti, Ce, Mn, Fe, Cr, Ni and Zn.

16. A catalyst-adsorbent according to claim 1, wherein the zeolite contains an ion of at least one soft acid or an intermediate acid having an electronegativity of 1.40 or more.

17. A catalyst-adsorbent according to claim 1, wherein the zeolite contains an ion of at least one IB element of periodic table, selected from the group consisting of Cu, Ag and Au.

18. A catalyst-adsorbent according to claim 1, wherein the zeolite contains at least one noble metal.

19. A catalyst-adsorbent according to claim 18, wherein the content of noble metal in zeolite is 5–200 g per ft$^3$ of the catalyst-adsorbent.

20. A catalyst-adsorbent according to claim 18, wherein the content of noble metal in zeolite is 5–60 g per ft$^3$ of the catalyst-adsorbent.

21. A catalyst-adsorbent according to claim 1, wherein the thickness of the catalyst-adsorbent layer is 20–150 μm.

22. A catalyst-adsorbent according to claim 1, wherein the concentration of Rh is 0.2–2.5% by weight based on the heat-resistant inorganic oxide.

23. A catalyst-adsorbent according to claim 1, wherein the concentration of Pt is 0.2–2.5% by weight based on the heat-resistant inorganic oxide.

24. A catalyst-adsorbent according to claim 1, wherein the monolithic carrier is made of a heat-resistant inorganic substance and has a honeycomb structure.

25. A catalyst-adsorbent according to claim 1, wherein the monolithic carrier has a honeycomb structure, is provided with electrodes, and can generate heat when electrified.

26. A catalyst-adsorbent according to claim 25, wherein the monolithic carrier having a honeycomb structure has a resistance-adjusting means between the electrodes.

27. A catalyst-adsorbent for purification of exhaust gases, comprising a monolithic carrier and a catalyst-adsorbent layer formed thereon, said catalyst-adsorbent layer comprising a catalyst for reduction of carbon monoxide, hydrocarbons and nitrogen oxides emitted from an internal combustion engine and an adsorbent for reduction of hydrocarbons emitted during cold start of the engine, said catalyst comprising catalyst particles each including a heat-resistant inorganic oxide and at least one noble metal selected from the group consisting of Pt, Pd and Rh loaded thereon, said catalyst at least containing catalyst particles each comprising a heat-resistant inorganic oxide and 2–30% by weight, based on said oxide, of only Pd loaded thereon, wherein the catalyst-adsorbent layer has, on the surface thereof, a discrete layer containing only Pd-loaded catalyst particles as the catalyst particles and the content of Pd in the catalyst is 50 to 300 g/ft$^3$ of the catalyst-adsorbent, and said adsorbent comprising zeolite adsorbent particles.

28. A catalyst-adsorbent for purification of exhaust gases, comprising a monolithic carrier and a catalyst-adsorbent layer formed thereon, said catalyst-adsorbent layer comprising a catalyst for reduction of carbon monoxide, hydrocarbons and nitrogen oxides emitted from an internal combustion engine and an adsorbent for reduction of hydrocarbons emitted during cold start of the engine, said catalyst consisting of catalyst particles each including a heat-resistant inorganic oxide and 2–30% by weight, based on said oxide, of only Pd loaded thereon, and said adsorbent comprising zeolite adsorbent particles.

* * * * *